US012183075B2

(12) United States Patent
Dvir et al.

(10) Patent No.: US 12,183,075 B2
(45) Date of Patent: Dec. 31, 2024

(54) METHOD AND SYSTEM FOR ALARM VERIFICATION BASED ON VIDEO ANALYTICS

(71) Applicant: BRIEFCAM LTD., Modi'in (IL)

(72) Inventors: Igal Dvir, Modi'in (IL); Shmuel Peleg, Modi'in (IL)

(73) Assignee: BRIEFCAM LTD., Modi'in (IL)

( * ) Notice: Subject to any disclaimer, the term of this patent is extended or adjusted under 35 U.S.C. 154(b) by 0 days.

(21) Appl. No.: 18/635,260

(22) Filed: Apr. 15, 2024

(65) Prior Publication Data

US 2024/0346821 A1 Oct. 17, 2024

Related U.S. Application Data

(60) Provisional application No. 63/495,845, filed on Apr. 13, 2023.

(51) Int. Cl.
*G06V 20/40* (2022.01)

(52) U.S. Cl.
CPC .............. *G06V 20/41* (2022.01); *G06V 20/44* (2022.01)

(58) Field of Classification Search
CPC ............................... G06V 20/41; G06V 20/44
See application file for complete search history.

(56) References Cited

U.S. PATENT DOCUMENTS

| 8,736,701 | B2 | 5/2014 | Marman et al. |
| 9,922,514 | B2* | 3/2018 | Gagvani ................ G06V 20/41 |
| 11,061,132 | B2 | 7/2021 | Kirsch et al. |
| 2009/0022362 | A1* | 1/2009 | Gagvani ................ G06T 7/254 340/541 |
| 2009/0309029 | A1 | 12/2009 | Zhevelev et al. |
| 2011/0090334 | A1* | 4/2011 | Hicks, III ........ G08B 13/19658 379/44 |
| 2011/0254680 | A1* | 10/2011 | Perkinson .............. G08B 29/14 340/5.1 |
| 2017/0118539 | A1* | 4/2017 | Lokshin ............... G11B 27/031 |
| 2017/0193810 | A1 | 7/2017 | Cao et al. |
| 2019/0066472 | A1* | 2/2019 | Gagvani .......... G08B 13/19695 |
| 2019/0353775 | A1* | 11/2019 | Kirsch ................. G01S 7/4004 |
| 2022/0309908 | A1 | 9/2022 | Venkateshappa |

FOREIGN PATENT DOCUMENTS

EP 0244824 B1 7/1992

* cited by examiner

*Primary Examiner* — Dhaval V Patel
(74) *Attorney, Agent, or Firm* — PEARL COHEN ZEDEK LATZER BARATZ LLP

(57) ABSTRACT

A method and system for alarm verification based on video analytics of a plurality of alerts issued by an alert system, wherein the alert system includes at least one sensor, are provided herein. The system may include: a server comprising a computer processor and an interface for communicating with the alert system, wherein the computer processor is configured to: receive at least one alert issued by the alert system; receive at least one video clip associated with the at least one alert; and analyze, by the computer processor, using video analytics algorithms, the at least one video clip, and determine whether the at least one alert is reliable above a predefined threshold.

9 Claims, 3 Drawing Sheets

METHOD AND SYSTEM FOR ALARM VERIFICATION BASED ON VIDEO ANALYTICS

FIELD OF THE INVENTION

The present invention relates generally to the field of video processing and, more particularly, to use of video analytics in alarm systems.

BACKGROUND OF THE INVENTION

Prior to setting for the background of the invention it would be useful to provide some definition which shall be used hereinafter.

The term "smart camera" as used herein is as a camera with embedded video analytics: most digital video cameras include sensors to transform optical data (e.g., photons) into electrical signals, as well as processors for converting the electrical signal into digital compressed video signal. More recently, powerful processors were added inside the camera casing to perform extra processing of the video, to provide insights into the video data. Such insights can take the form of detection of objects or events in the video, as well as generation of alarms. This extra processing is referred to as "video analytics", and cameras with some levels of embedded video analytics are referred to as "smart cameras".

The term video content analysis or video content analytics (VCA), also known as video analysis or video analytics (VA), as used herein, is the capability of automatically analyzing video to detect and determine temporal and spatial events. This technical capability is used in a wide range of domains including entertainment, video retrieval and video browsing, health-care, retail, automotive, transport, home automation, flame and smoke detection, safety, and security. The algorithms can be implemented as software on general-purpose machines, or as hardware in specialized video processing units.

Basic components in any security system are alarm systems. Such alarm systems may contain sensors such as: dry contact sensors for doors and gates, passive infra-red (PIR) sensors to detect activity motion sensors on smart fences, radar-based sensors to detect outdoor activity, closed circuit television (CCTV) cameras with built-in video analytics implementing a so-called smart camera, and many other options.

The purpose of the alarm system is to automatically detect threats using various technologies and to generate an alarm to a human entity that is usually located in a command-and-control room. In any alarm system there is an inherent tradeoff between the number of false positive detections (false alarms) vs. false negatives (miss detections). When the sensor is too sensitive, it will generate too many false positive alarms while reducing the number of false negatives (Missed alarms). On the other hand, when the sensor is less sensitive, it will generate less false positives, however, this will increase the false negatives rate. Any alarm system should be calibrated to the required "working point", which is the best compromise based on organizational needs.

Improving such "working point" is normally challenging due to either physical limitations or processing capabilities. Examples for physical limitations could be movement sensors, that are limited to detecting vibrations but can't "see" who is generating the vibration, or radars that can sense better motion in specific directions but do not have imaging capabilities. Processing limitations are usually related to the required size, power, and cost of the sensors.

In currently available alarm systems, when the sensor is triggered, it usually generates an alarm in the control room. In such cases, human intervention is required to verify whether the alarm is valid and requires some action or whether it's a false alarm or nuisance alarm. In many cases, such human verification is done by remotely moving and pointing a camera to the area of the alarm and viewing live video to understand the situation and decide on actions. In some cases, when there are cameras that cover continuously the area of the alarm, the human verification is done by watching recorded video of a short time prior to the alarm (typically 5-30 seconds) in addition to watching live video of the scene, to get the full context of the source of the alarm. This workflow is also true in cases where the sensor is a smart camera with embedded video analytics. In such cases, the video is available for the sensor, however due to processing resources limitation, there are limited computing capabilities embedded in the camera, thus a human verification by watching the same video of the alarm is required.

SUMMARY OF THE INVENTION

The present invention, in embodiments thereof, addresses the aforementioned drawbacks of currently available alarm systems including those with smart cameras. Embodiments of the present invention are aimed at improving significantly the accuracy of sensor-based alarm systems by addressing both their physical limitations (e.g., lack of visual sensing) and their limited processing capabilities. The solution for both limitations is by introducing a "verification layer" based on images and video from the location of the alarm at the scene, as well as sophisticated algorithms that require significant processing capabilities that are not available at the sensors level.

In accordance with some embodiments of the present invention, a method of alarm verification based on video analytics of alerts issued by an alert system, wherein the alert system includes at least one sensor, is provided herein. The method may include the following steps: receiving at a computer processor, at least one alert issued by the alert system; receiving, at the computer processor, at least one video clip associated with the at least one alert; analyzing, by the computer processor, using video analytics algorithms, the at least one video clip, and determining, by the computer processor, whether the at least one alert is reliable above a predefined threshold.

In accordance with some embodiments of the present invention, a system for alarm verification based on video analytics of a plurality of alerts issued by an alert system wherein the alert system comprises at least one sensor, is provided herein. The system may include: a server comprising a computer processor and an interface for communicating with the alert system, wherein the computer processor is configured to: receive at least one alert issued by the alert system; receive at least one video clip associated with the at least one alert; and analyze, by the computer processor, using video analytics algorithms, the at least one video clip, and determine whether the at least one alert is reliable above a predefined threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1A:
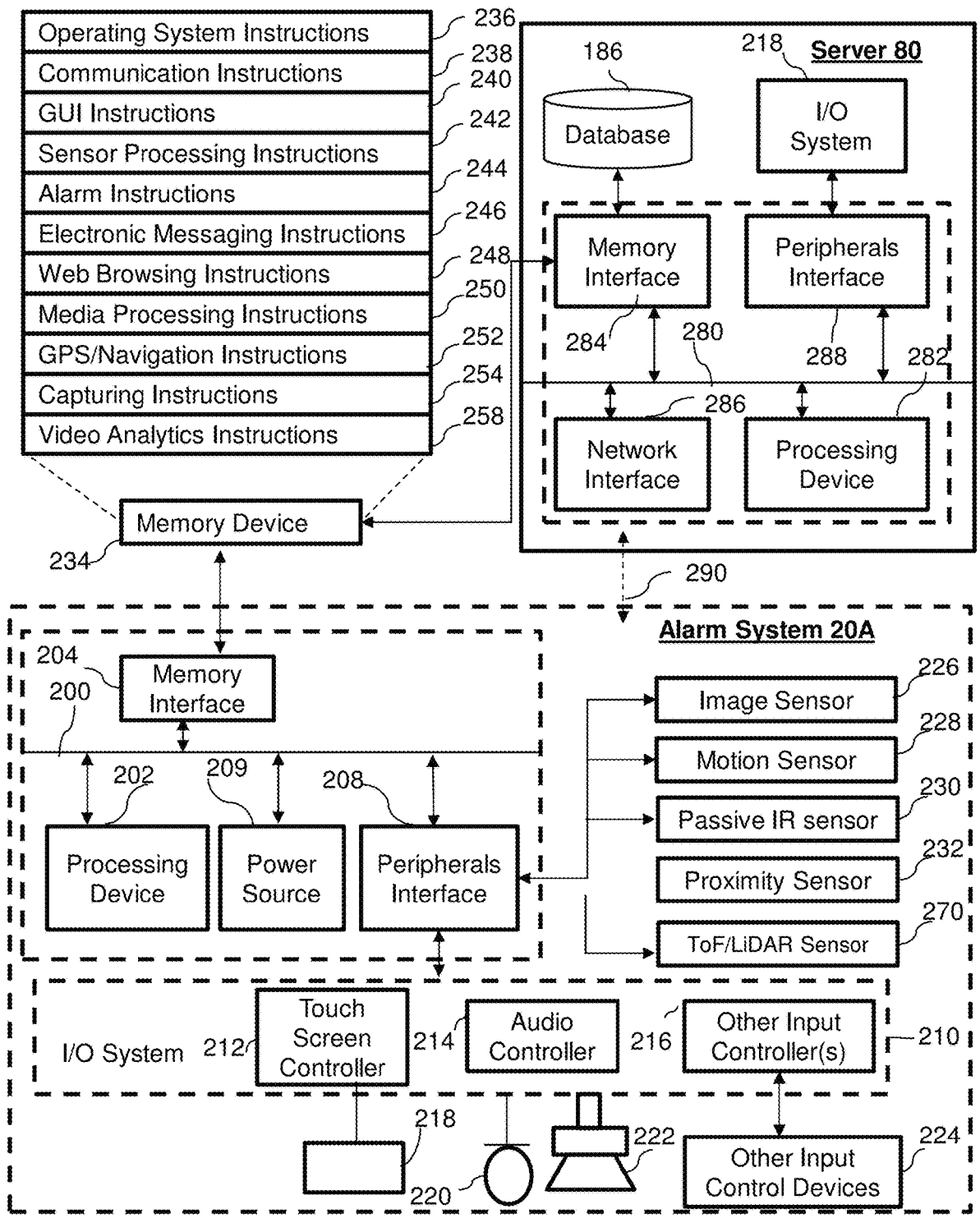
FIG. 1A is a block diagram illustrating an architecture of a system accordance with some embodiments of the present invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with embodiments of the present invention the inventors suggest herein an automated process that takes some of the roles of the human in the loop. The solution includes a verification entity that receives triggers from various sensors and verifies the validity of the event in order to generate an alarm to a human supervisor in case the event is classified as a valid alarm.

In accordance with some embodiments of the present invention, in some sample cases, when there are video cameras that cover the area of the alarm, automatic systems for alarm verification may analyze a short video clip recorded prior to the alarm (typically 5-30 seconds), and possibly a video of the scene (recorded or live video) for some period following the alarm.

In accordance with some embodiments of the present invention, the automatic verification process is done by using the resources that are available at the verification entity but are not available at the sensor. There are two major type of resources that can be leveraged in the verification entity:

Visual verification of non-visual sensors—many sensors are using different modalities such as PIR, dry contact, RF through radar technology, vibration through accelerometers or fiber lines etc. Such technologies can sense different types of activities; however, they can't distinguish between a legitimate activity that doesn't require an alarm (for example an animal in the field) vs. a real threat such as a person moving in restricted area that requires an alarm. Such verification can be done automatically by pointing PTZ (Pan Tilt Zoom) camera to the location of the alarm and using video analytics tools to classify the object that moves into an animal or a person. In this mode of operation, PTZ camera is dynamically allocated to the area of the alarm, instead of having full coverage of the entire area with cameras, which will need much more resources in equipment and in computing.

Enhancing video analytics of smart cameras—in some sample cases, when there are video cameras that already cover the area of the alarm, automatic systems for alarm verification may analyze a short video clip recorded prior to the alarm (typically 5-30 seconds), and possibly a video of the scene (recorded or live video) for some period following the alarm.

Dynamic processing allocation—when the sensor is visual sensor, such as smart camera that can detect activities and generate alarms accordingly, the automatic verification can leverage better processing resources than those available at the camera. This will increase the confidence of the alarm by validation of the alarm before generating an alarm to the human supervisor. The main reasons why such resources are available in the verification entity but not by the camera are: cost—the resources can be dynamically allocated to the relevant cameras, meaning that the resources are shared, providing cost saving when not all cameras generate alarms at the same time, size and Power—cameras are usually limited in size and power dissipation thus limited in processing power; and deployment limitation—cameras are usually used for 7-10 years after installation. In such a period technology is dramatically advanced. Although software in cameras can be remotely upgraded, the hardware in the cameras will not change and will limit its capabilities. In contrast to embedded computing in the camera, the processing hardware and software at the verification entity can be easily upgraded.

In addition to saving human resources by automation of the verification layer, there are four more very important advantages of the embodiments of the present invention by which they improve currently available technology:

False/Nuisance alarm fatigue—Increasing the detection rate (reducing cases when an event that should have been detected is not detected), requires increasing the sensor sensitivity. However, the increased sensitivity will come with an increased rate of false positive alarms. Humans will become indifferent to coming alarms if too many of them appear false. A machine doesn't care how many alarms are false, and it will analyze any accepted trigger in the same way and with the same resources. This enables increasing the sensitivity of the sensor, that will improve the detection rate of the sensor. While these increased false positive alarms will disturb a human operator, the automatic verification layer will filter the increased level of false positives coming from the sensor, and due to its improved capabilities will enable to reject most of the false positive alarms.

Improvement of overall system calibration—when verification is done through an automatic process, sensor's statistics regarding true positive vs. false positives can be generated easily and can be used to better calibrate the sensor's position and sensitivity.

Reinforcement learning of sensor's model—many sensors are using machine learning methods to process low level signals into a detection decision. Automatic verification layer enables on-line training such as reinforcement learning method suggests training sensor neural network model based on feedback from the verification layer.

Detection of faulty sensors—changes, as detected by the verification layer, of the number of correct alarms vs. false alarms as generated by a sensor—can indicate a malfunction of the sensor or the smart camera.

In accordance with some embodiments of the present invention, the system and method may use alarm metadata obtained from the sensors for training purposes. When a sensor triggers an alarm, it may or may not provide extra metadata related to the generated alarm. In case of an alarm generated by a smart camera with embedded video analytics, such metadata can include the following: accurate video frame, and possibly a bounding box inside the frame of the object generating the alarm; some indications to the properties or the activity that generated the alarm. These can be explicit properties understood by humans, of some "latent vectors" generated by a video analytic system.

In accordance with some embodiments of the present invention, the verification system may or may not use the provided metadata. In case the sensor and the provided metadata are known in advance the system can be trained to use that metadata, but the system can be applied in cases where the alarm is generated by a system not known in advance, in which case the nature of the provided metadata is unknown.

In addition, it should be noted that a system can include video streams that are not covered by any alarm, or that the alarms are not provided for all necessary cases. For example, the system can only have an input from a simple camera with no video analytic capabilities that does not provide any alarm, or when alarms are given only in some of the required cases. In such cases the verification system will always monitor the input video stream, but whenever an alarm is given—the system changes its processing—conditioned on the received alarm.

A system for alarm verification based on video analytics of a plurality of alerts issued by an alert system wherein the alert system comprises at least one sensor is provided herein. The system may include: a server comprising a computer processor and an interface for communicating with the alert system, wherein the computer processor is configured to: receive at least one alert issued by the alert system; receive at least one video clip associated with the at least one alert; and analyze, by the computer processor, using video analytics algorithms, the at least one video clip, and determine whether the at least one alert is reliable above a predefined threshold.

According to some embodiments of the present invention, at least one of the at least one sensor is a camera and wherein the camera generates the at least one video clip.

According to some embodiments of the present invention, the camera is a smart camera comprising a processing unit and a computer memory having smart camera instructions which, when executed, cause the processing unit to analyze the video clip and issue an alert based on the video clip.

According to some embodiments of the present invention, the video analytics algorithms are such that executing them by the computer processor results in significantly higher reliability level than the results of executing the smart camera instructions by the processing unit of the smart camera.

According to some embodiments of the present invention, the system may further include a set of instructions that, when executed, cause the computer processor to receive at least one video clip associated with the alert, prior to the alert being issued by alert system, wherein the analyzing, by the computer processor, using video analytics algorithms further comprises using the data received from the at least one video clip associated with the alert, prior to the alert being issued by alert system.

According to some embodiments of the present invention, the system may further include a set of instructions that, when executed, cause the computer processor to receive metadata from the at least one sensors, and use the metadata to train the video analytics algorithms.

FIG. 1A shows a block diagram of the configuration of an alarm system 20A and a server 80 configured perform verification of the alerts issued by the alert system based on video analytics. With regard to the alarm system 20A, and according to some embodiments, the alarm system 20A, directly or indirectly, may access a bus 200 (or another data transfer mechanism) that interconnects subsystems and components for transferring information within alarm system 20A. For example, bus 200 may interconnect a processing device 202, a memory interface 204, and a peripherals interface 208 connected to an I/O system 210. Power source 209 provides the power to the alarm system and it may include a primary or a rechargeable battery (not shown), DC-DC converters (not shown) and other components required for the proper operation of alarm system 20A.

In some embodiments, processing device 202 may use a memory interface 204 to access data and a software product stored on a memory device 234 or a non-transitory computer-readable medium device 234.

It should be noted that in some embodiments memory device 234 may be part of the server whereas in other embodiments memory device 234 may be part of the alarm system 20A.

According to some embodiments, the peripherals interface 208 may also be connected to sensors, devices, and subsystems to facilitate multiple functionalities. In one embodiment, the peripherals interface 208 may be connected to an I/O system 210 configured to receive signals or input from devices and to provide signals or output to one or more devices that allow data to be received and/or transmitted by the alarm system 20.

According to some embodiments, the peripherals interface 208 may also be connected to an image sensor 226, a motion sensor 228, a passive infrared senor 230, and/or a proximity sensor 232 to facilitate image capturing, orientation, lighting, and proximity functions. In addition, a GPS receiver may also be integrated with, or connected to, alarm system 20, such as GPS receivers typically integrated into alarm systems. Alternatively, GPS software may permit the alarm system 20 to access an external GPS receiver (e.g., connecting via a serial port or Bluetooth).

According to some embodiments of the present invention, the processing device is further configured to issue an alert as soon as it detects an unusual event. According to some embodiments, the alert is sent to server 80 in communication with the alarm system 20A.

Consistent with the present disclosure, alarm system 20A may use a memory interface 204 to access a memory device 234. The memory device 234 may store an operating system 236, such as Android, IOS, MS Windows, Linux, or any other embedded operating system. Operating system 236 may include instructions for handling basic system services and for performing hardware-dependent tasks. In some implementations, the operating system 236 may be a kernel (e.g., Linux kernel).

The memory device 234 may also store communication instructions 238 to facilitate communicating with one or more additional devices, one or more computers, and/or one or more servers. The memory device 234 may include: graphical user interface instructions 240 to facilitate graphic user interface processing; sensor processing instructions 242 to facilitate sensor-related processing and functions; video analytics instructions 244 to facilitate video analytics functions; electronic messaging instructions 246 to facilitate electronic-messaging-related processes and functions; web browsing instructions 248 to facilitate web browsing-related processes and functions; media processing instructions 250 to facilitate media processing-related processes and functions; GPS/navigation instructions 252 to facilitate GPS and navigation-related processes and instructions; capturing instructions 254 to facilitate processes and functions related to image sensor 226.

Each of the above-identified instructions and applications may correspond to a set of instructions for performing one or more functions described above. These instructions do not necessarily need to be implemented as separate software programs, procedures, or modules. The memory device 234 may include additional instructions or fewer instructions. Furthermore, various functions of the alarm system 20A may be implemented in hardware and/or software, including in one or more signal processing and/or application-specific integrated circuits.

Still referring to FIG. 1A, and according to some embodiments of the present invention, a server 80 for validating alarms detected by alarm system 20A, is illustrated herein. Processing device 282 may include at least one processor configured to execute computer programs, applications, methods, processes, or other software to perform embodiments described in the present disclosure.

In some embodiments, processing device 282 may use a memory interface 284 to access data and a software product stored on a memory device or a non-transitory computer-readable medium or to access a data structure 186.

In accordance with embodiments of the present invention computer processor on the server 80 may configured to: receive at least one alert issued by the alert system 20A; receive at least one video clip associated with the at least one alert; and analyze, by the computer processor, using video analytics algorithms, the at least one video clip, and determine whether the at least one alert is reliable above a predefined threshold.

According to some embodiments, the network interface 286 may provide two-way data communication to a network. In FIG. 1, communication 290 between the alarm system 20A and server 80 is represented by a dashed arrow. In one embodiment, the network interface 286 may include an integrated services digital network (ISDN) card, cellular modem, satellite modem, or a modem to provide a data communication connection over the Internet. As another example, the network interface 286 may include a wireless local area network (WLAN) card. In another embodiment, the network interface 286 may include an Ethernet port connected to radio frequency receivers and transmitters. The specific design and implementation of the network interface 286 may depend on the communications network(s) over which the alarm system 20A and the server 80 may communicate.

According to some embodiments, the server 80 may also include a peripherals interface 288 coupled to the bus 280. The peripherals interface 288 may also be connected to devices, and subsystems to facilitate multiple functionalities as performed by the server 80. In some embodiments, those devices and subsystems may comprise a display screen (e.g., CRT or LCD) a USB port, and the like.

The components and arrangements shown in FIG. 1 for both server 80 and the alarm system 20A are not intended to limit the disclosed embodiments. As will be appreciated by a person skilled in the art having the benefit of this disclosure, numerous variations and/or modifications may be made to the depicted configuration of server 80 and the alarm system 20A. For example, not all the depicted components may be essential for the operation of server 80 or the alarm system 20A in all cases. Any component may be located in any appropriate part of server 80, and the components may be rearranged into a variety of configurations while providing the functionality of the disclosed embodiments. For example, some types of alarm systems 20A may include only part of the depicted sensors and include sensors which are not depicted.

Alarm system 20A may include Lidar/ToF sensor 270. Lidar instructions 258 and ToF instructions 260 are computer code instructions stored on memory device 234 and when executed, cause processing device 202, to control Lidar/ToF sensor 270 to emit a light beam and receive reflections and to calculate range, distance and 3D mapping of the scene and the like. There can be used issuing an alarm.

Figure 1B:
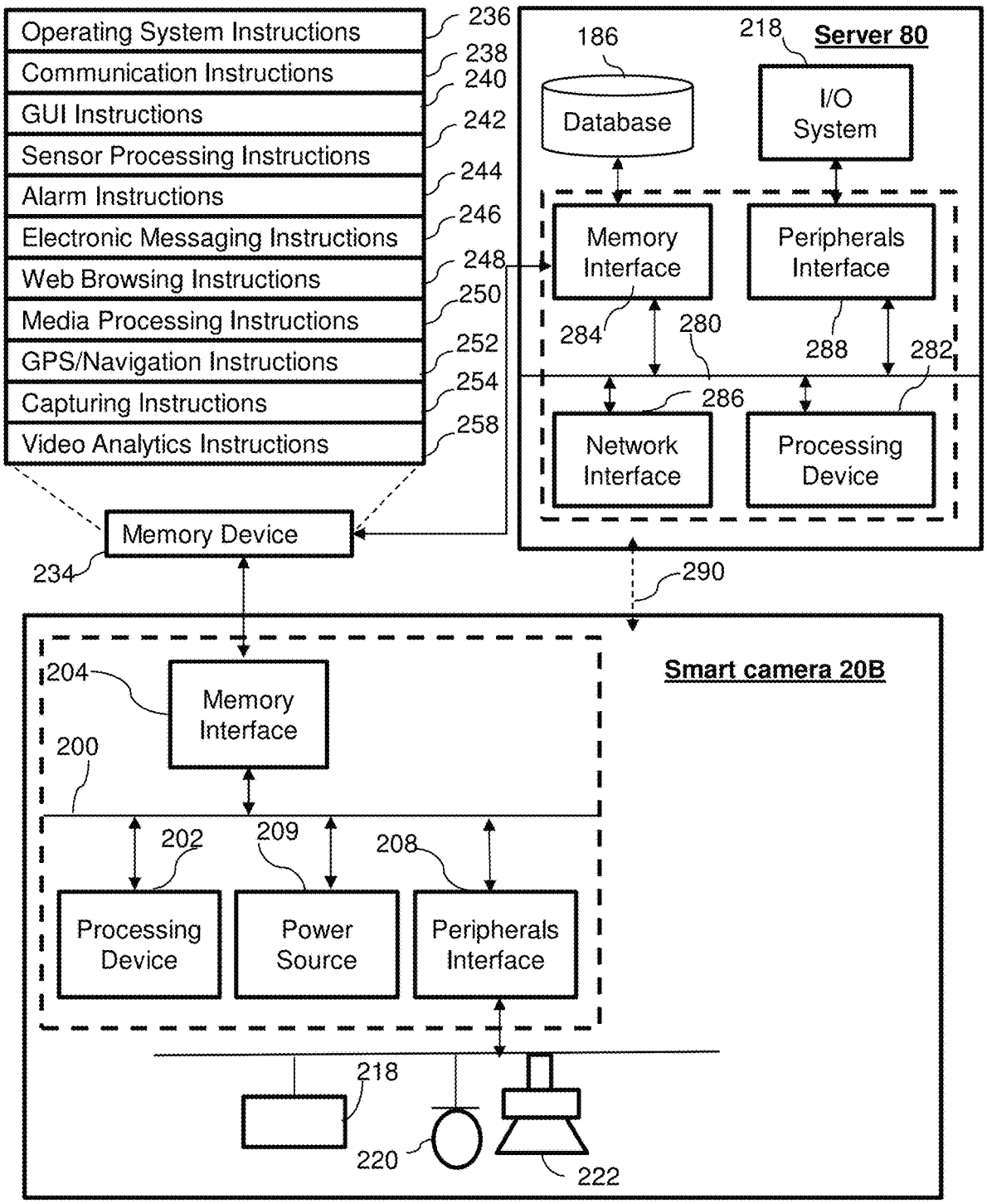
FIG. 1B is a block diagram illustrating an architecture of another system accordance with some embodiments of the present invention.

FIG. 1B shows a block diagram of the configuration of a smart camera 20B and a server 80 to serve as alarm verification based on video analytics. With regard to the smart camera 20B, and according to some embodiments, the smart camera 20B, directly or indirectly, may access a bus 200 (or another data transfer mechanism) that interconnects subsystems and components for transferring information within the smart camera 20B. For example, bus 200 may interconnect a processing device 202, a memory interface 204, and a peripherals interface 208 connected to an I/O system 210. Power source 209 provides the power to the smart camera and it may include a primary or a rechargeable battery (not shown), DC-DC converters (not shown) and other components required for the proper operation of the smart camera 20B.

In some embodiments, processing device 202 may use a memory interface 204 to access data and a software product stored on a memory device 234 or a non-transitory computer-readable medium device 234.

It should be noted that in some embodiments memory device 234 may be part of the server whereas in other embodiments memory device 234 may be part of smart camera 20A.

According to some embodiments, the peripherals interface 208 may also be connected to sensors, devices, and subsystems to facilitate multiple functionalities. In one embodiment, the peripherals interface 208 may be connected to an I/O system 210 configured to receive signals or input from devices and to provide signals or output to one or more devices that allow data to be received and/or transmitted by the smart camera 20B. In one example, the I/O system 210 may include a touch screen controller 212, audio controller 214, and/or other types of input controller(s) 216. The touch screen controller 212 may be coupled to a touch screen 218. The touch screen 218 and the touch screen controller 212 may, for example, detect contact, and movement, using any of a plurality of touch sensitivity technologies, including but not limited to capacitive, resistive, infrared, and surface acoustic wave technologies as well as other proximity sensor arrays or other elements for determining one or more points of contact with the touch screen 218. The touch screen 218 may also, for example, be used to implement virtual or soft buttons and/or a keyboard. While a touch screen 218 is shown in FIG. 1B, I/O system 210 may include a display screen (e.g., LCD or LED) in place of a touch screen 218. According to some embodiments, the peripherals interface 208 may also be connected to an image sensor 226, a motion sensor 228, a light sensor 230, and/or a proximity sensor 232 to facilitate image capturing, orientation, lighting, and proximity functions. In addition, a GPS receiver may also be integrated with, or connected to, the smart camera 20, such as GPS receivers typically integrated into mobile communications devices. Alternatively, GPS software may permit the smart camera 20B to access an external GPS receiver (e.g., connecting via a serial port or Bluetooth).

Consistent with the present disclosure, smart camera 20B may use a memory interface 204 to access a memory device 234. The memory device 234 may store an operating system 236, such as Android, IOS, MS Windows, Linux, or any other embedded operating system. Operating system 236 may include instructions for handling basic system services and for performing hardware-dependent tasks. In some implementations, the operating system 236 may be a kernel (e.g., Linux kernel).

The memory device 234 may also store communication instructions 238 to facilitate communicating with one or more additional devices, one or more computers, and/or one or more servers. The memory device 234 may include: graphical user interface instructions 240 to facilitate graphic user interface processing; sensor processing instructions 242 to facilitate sensor-related processing and functions; video analytics instructions 244 to facilitate video analytics processes and functions; electronic messaging instructions 246 to facilitate electronic-messaging-related processes and functions; web browsing instructions 248 to facilitate web browsing-related processes and functions; media processing instructions 250 to facilitate media processing-related processes and functions; GPS/navigation instructions 252 to facilitate GPS and navigation-related processes and instructions; capturing instructions 254 to facilitate processes and functions related to image sensor 226.

Each of the above-identified instructions and applications may correspond to a set of instructions for performing one or more functions described above. These instructions do not necessarily need to be implemented as separate software programs, procedures, or modules. The memory device 234 may include additional instructions or fewer instructions. Furthermore, various functions of the smart camera 20B may be implemented in hardware and/or software, including in one or more signal processing and/or application-specific integrated circuits.

Still referring to FIG. 1B, and according to some embodiments of the present invention, a server 80 for verification of alarms detected by on at least one smart camera 20B within an indoor space, is illustrated herein.

Processing device 282 may include at least one processor configured to execute computer programs, applications, methods, processes, or other software to perform embodiments described in the present disclosure.

In some embodiments, processing device 282 may use a memory interface 284 to access data and a software product stored on a memory device or a non-transitory computer-readable medium or to access a data structure 186.

In accordance with embodiments of the present invention computer processor on the server 80 may configured to: receive at least one alert issued by the smart camera 20A; receive at least one video clip associated with the at least one alert; and analyze, by the computer processor, using video analytics algorithms, the at least one video clip, and determine whether the at least one alert is reliable above a predefined threshold. In some embodiments the processing unit of smart camera can also be used to carry out theses instructions.

According to some embodiments, the network interface 286 may provide two-way data communication to a network. In FIG. 1B, communication 290 between the smart camera 20B and server 80 is represented by a dashed arrow. In one embodiment, the network interface 286 may include an integrated services digital network (ISDN) card, cellular modem, satellite modem, or a modem to provide a data communication connection over the Internet. As another example, the network interface 286 may include a wireless local area network (WLAN) card. In another embodiment, the network interface 286 may include an Ethernet port connected to radio frequency receivers and transmitters. The specific design and implementation of the network interface 286 may depend on the communications network(s) over which the smart camera 20 and the server 80 may communicate.

According to some embodiments, the server 80 may also include a peripherals interface 288 coupled to the bus 280. The peripherals interface 288 may also be connected to devices, and subsystems to facilitate multiple functionalities as performed by the server 80. In some embodiments, those devices and subsystems may comprise a display screen (e.g., CRT or LCD) a USB port, and the like.

The components and arrangements shown in FIG. 1B for both server 80 and the smart camera 20 are not intended to limit the disclosed embodiments. As will be appreciated by a person skilled in the art having the benefit of this disclosure, numerous variations and/or modifications may be made to the depicted configuration of server 80 and the smart camera 20B. For example, not all the depicted components may be essential for the operation of server 80 or the smart camera 20B in all cases. Any component may be located in any appropriate part of server 80, and the components may be rearranged into a variety of configurations while providing the functionality of the disclosed embodiments. For example, some types of smart cameras 20 may include only part of the depicted sensors and include sensors which are not depicted.

Smart camera 20B may include Lidar/ToF sensor 270. Lidar instructions 258 and ToF instructions 260 are computer code instructions stored on memory device 234 and when executed, cause processing device 202, to control Lidar/ToF sensor 270 to emit a light beam and receive reflections and to calculate range, distance and 3D mapping of the scene, as the case may be.

Figure 2:
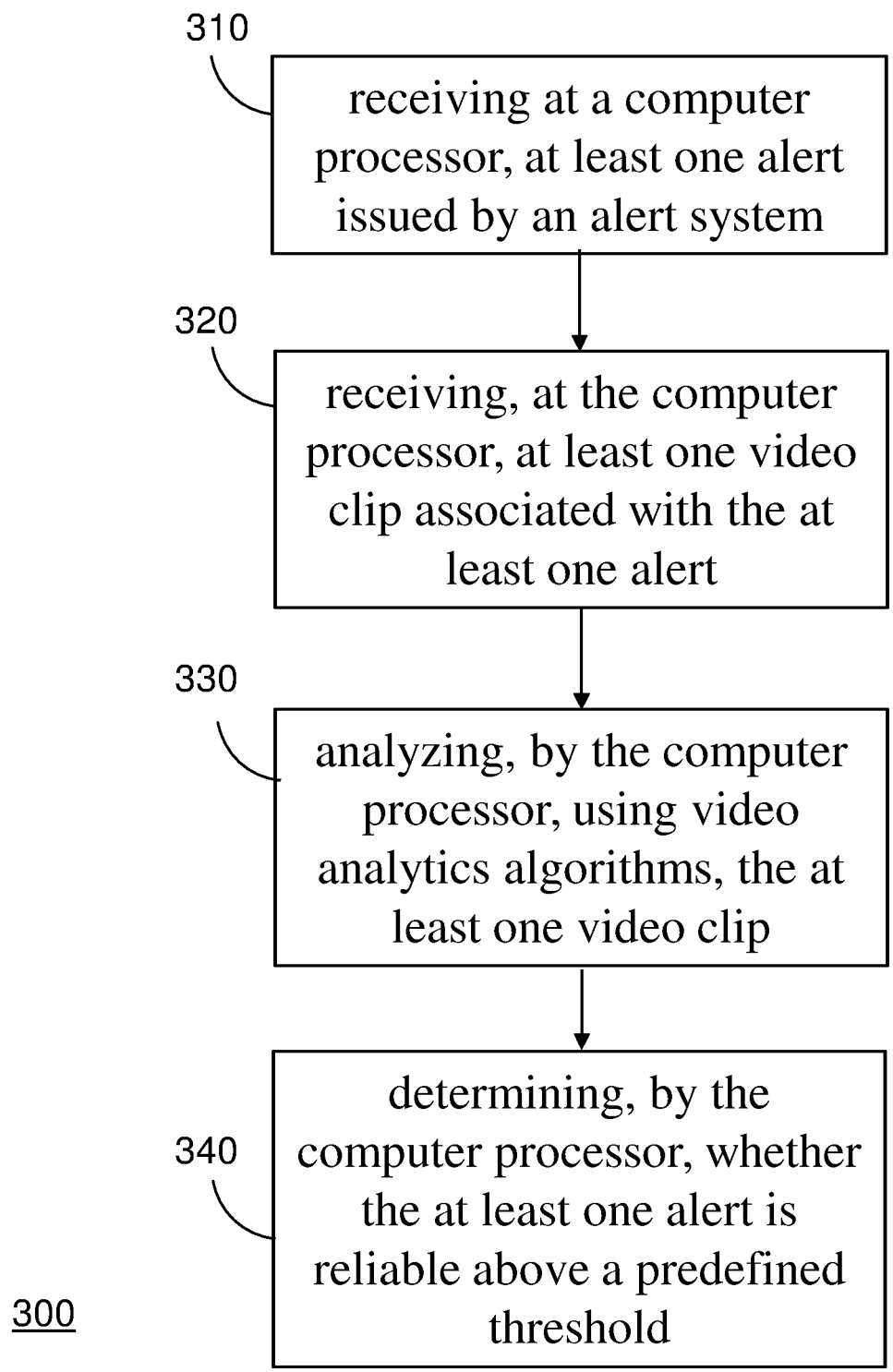
FIG. 2 is a high-level flowchart illustrating a method in accordance with some embodiments of the present invention; and It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 2 is a high-level flowchart illustrating a method in accordance with some embodiments of the present invention. Method 300 for alarm verification based on video analytics of alerts issued by an alert system, wherein the alert system comprises at least one sensor is provided herein. Method 300 may include the following steps: receiving at a computer processor, at least one alert issued by the alert system 310; receiving, at the computer processor, at least one video clip associated with the at least one alert 320; analyzing, by the computer processor, using video analytics algorithms, the at least one video clip 330; and determining, by the computer processor, whether the at least one alert is reliable above a predefined threshold 340.

According to some embodiments of the present invention, in method 300, at least one of the at least one sensor is a camera and wherein the camera generates the at least one video clip.

According to some embodiments of the present invention, the camera is a smart camera comprising a processing unit and a computer memory having smart camera instructions thereon which, when executed, cause the processing unit to analyze the video clip and issue an alert based on the video clip.

According to some embodiments of the present invention, the video analytics algorithms are such that executing them by the computer processor results in significantly higher reliability level than the results of executing the smart camera instructions by the processing unit of the smart camera.

According to some embodiments of the present invention, method 300 may further include the step of receiving at least one video clip associated with the alert, prior to the alert being issued by alert system, wherein the analyzing, by the computer processor, using video analytics algorithms further comprises using the data received from the at least one video clip associated with the alert, prior to the alert being issued by alert system.

According to some embodiments of the present invention, method 300 may further include the step of receiving metadata from the at least one sensor, and using the metadata to train the video analytics algorithms.

Some embodiments of the invention may be carried out by a computing system. For example, a processor, operatively connected to a memory holding data and software, code, or instructions, may be configured or programmed by the software, code or instructions to carry out embodiments of the present invention. More than one such processor or computing system may be use.

It should be noted that all methods according to some embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment", or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of alarm verification based on video analytics of alerts issued by an alert system, wherein the alert system comprises at least one sensor, the method comprising:
receiving at a computer processor, at least one alert issued by the alert system;
receiving, at the computer processor, at least one video clip associated with the at least one alert;
analyzing, by the computer processor, using video analytics algorithms, the at least one video clip, and
determining, by the computer processor, whether the at least one alert is reliable above a predefined threshold, wherein the at least one sensor comprises a camera producing a camera video and associated with a processing unit and a computer memory having instructions thereon which, when executed, cause the processing unit to analyze the camera video and issue the alert based on the camera video, and wherein the video analytics algorithms are such that executing them by the computer processor on the at least one video clip, results in higher reliability level of the alert, compared with the reliability level of the alert following the execution of the instructions by the processing unit associated with the camera.

2. The method according to claim 1, further comprising receiving at least one video clip associated with the alert, prior to the alert being issued by alert system, wherein the analyzing, by the computer processor, using video analytics algorithms further comprises using the data received from the at least one video clip associated with the alert, prior to the alert being issued by alert system.

3. The method according to claim 1, further comprising receiving metadata from the at least one sensor, and using the metadata to train the video analytics algorithms.

4. A non-transitory computer readable medium for alarm verification based on video analytics of a plurality of alerts issued by an alert system wherein the alert system comprises at least one sensor, the computer readable medium comprising a set of instructions that, when executed, cause at least one computer processor to:

receive at least one alert issued by the alert system;

receive at least one video clip associated with the at least one alert;

analyze, using video analytics algorithms, the at least one video clip, and determine whether the at least one alert is reliable above a predefined threshold, wherein the at least one sensor comprises a camera producing a camera video and associated with a processing unit and a computer memory having instructions thereon which, when executed, cause the processing unit to analyze the camera video and issue the alert based on the camera video, and wherein the video analytics algorithms are such that executing them by the computer processor on the at least one video clip, results in higher reliability level of the alert, compared with the reliability level of the alert following the execution of the instructions by the processing unit associated with the camera.

5. The non-transitory computer readable medium according to claim 4, further comprising a set of instructions that, when executed, cause the at least one computer processor to receive at least one video clip associated with the alert, prior to the alert being issued by alert system, wherein the analyzing, by the computer processor, using video analytics algorithms further comprises using the data received from the at least one video clip associated with the alert, prior to the alert being issued by alert system.

6. The non-transitory computer readable medium according to claim 4, further comprising a set of instructions that, when executed, cause the at least one computer processor to receive metadata from the at least one sensor, and using the metadata to train the video analytics algorithms.

7. A system for alarm verification based on video analytics of a plurality of alerts issued by an alert system wherein the alert system comprises at least one sensor, the system comprising:

a server comprising a computer processor and an interface for communicating with the alert system, wherein the computer processor is configured to:
receive at least one alert issued by the alert system;
receive at least one video clip associated with the at least one alert; and
analyze, by the computer processor, using video analytics algorithms, the at least one video clip, and
determine whether the at least one alert is reliable above a predefined threshold,
wherein the at least one sensor comprises a camera producing a camera video and associated with a processing unit and a computer memory having instructions thereon which, when executed, cause the processing unit to analyze the camera video and issue the alert based on the camera video, and
wherein the video analytics algorithms are such that executing them by the computer processor on the at least one video clip, results in higher reliability level of the alert, compared with the reliability level of the alert following the execution of the instructions by the processing unit associated with the camera.

8. The system according to claim 7, further comprising a set of instructions that, when executed, cause the computer processor to receive at least one video clip associated with the alert, prior to the alert being issued by alert system, wherein the analyzing, by the computer processor, using video analytics algorithms further comprises using the data received from the at least one video clip associated with the alert, prior to the alert being issued by alert system.

9. The system according to claim 7, further comprising a set of instructions that, when executed, cause the computer processor to receive metadata from the at least one sensor, and use the metadata to train the video analytics algorithms.

* * * * *